United States Patent [19]

Janson

[11] Patent Number: 4,782,932

[45] Date of Patent: Nov. 8, 1988

[54] TORSION DAMPING MECHANISM

[75] Inventor: David A. Janson, Plymouth, Mich.

[73] Assignee: Eaton Corporation, Cleveland, Ohio

[21] Appl. No.: 793,802

[22] Filed: Nov. 1, 1985

[51] Int. Cl.$^4$ ............................................. F16D 13/68
[52] U.S. Cl. .............................. 192/70.17; 192/106.1; 464/68
[58] Field of Search ............... 192/106.1, 70.18, 70.17, 192/70.16, 30 V; 464/68, 24

[56] References Cited

U.S. PATENT DOCUMENTS

| | | | |
|---|---|---|---|
| 2,337,134 | 12/1943 | Thelander | 192/63 |
| 4,433,770 | 2/1984 | Loizeau et al. | 464/68 X |
| 4,485,906 | 12/1984 | Lutz et al. | 192/70.17 X |
| 4,564,097 | 1/1986 | Kabayama | 192/70.17 X |
| 4,601,676 | 7/1986 | Tojima et al. | 464/68 X |

FOREIGN PATENT DOCUMENTS 2089472 6/1982 United Kingdom ................ 464/68

Primary Examiner—Andrew V. Kundrat
Attorney, Agent, or Firm—P. S. Rulon

[57] ABSTRACT

A torsional damping mechanism (22) adapted to be disposed between an engine (10) and a transmission (12) operative to drive ground wheels (16) of a vehicle. The mechanism inclues a viscous damping device (30), an idle rattle assembly (32), a torque transmitting torsion spring bar (28) disposed in series with the idle rattle assembly and in parallel with the viscous damping device, and a mechanical friction assembly for connecting the mechanism to the engine. Mechanism (22) is structurally configured to have a low inertia. The viscous damping device includes lost motion means (48k, 50c) which allows attenuation of low amplitude torsionals without damping.

25 Claims, 2 Drawing Sheets

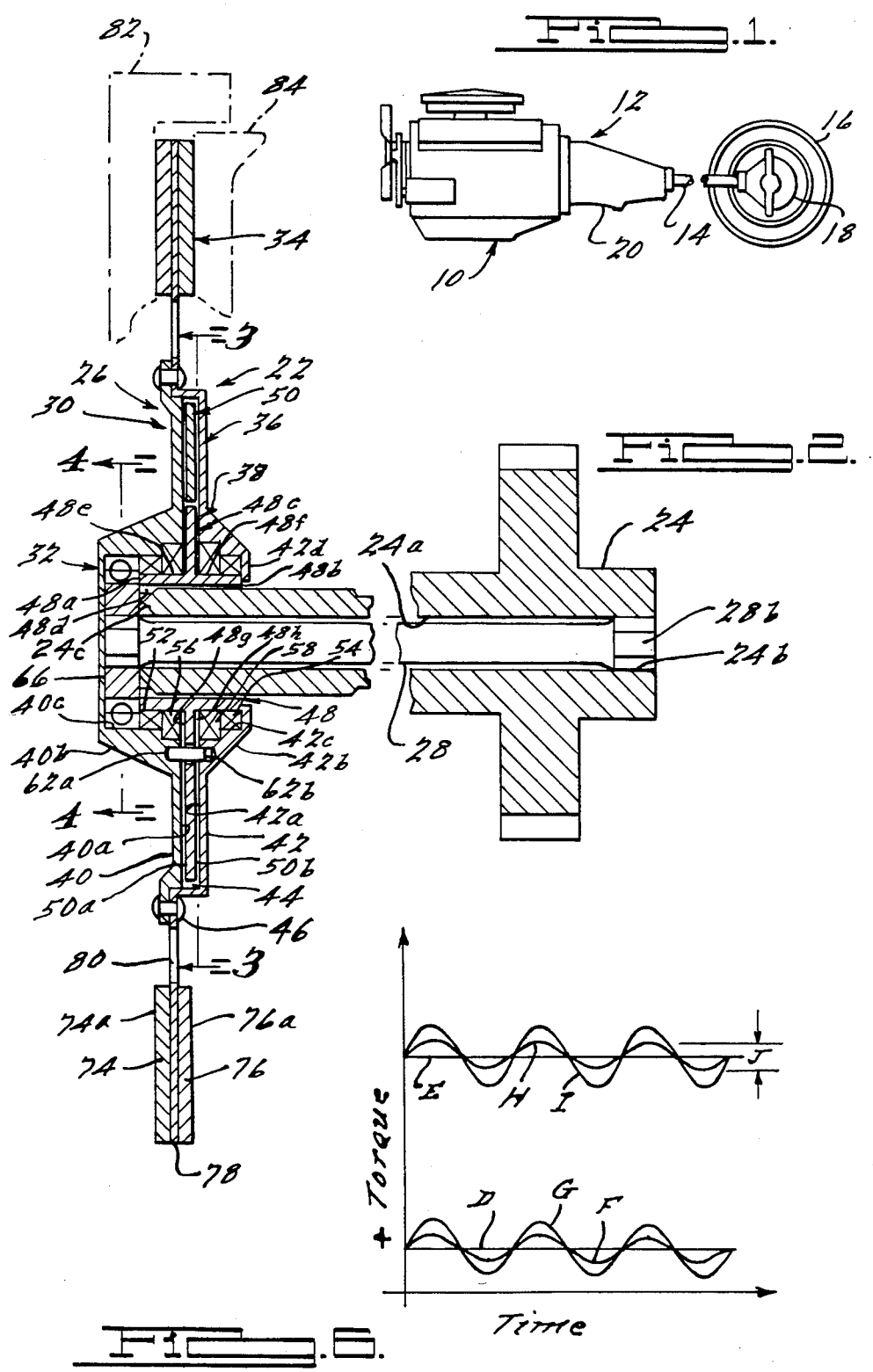

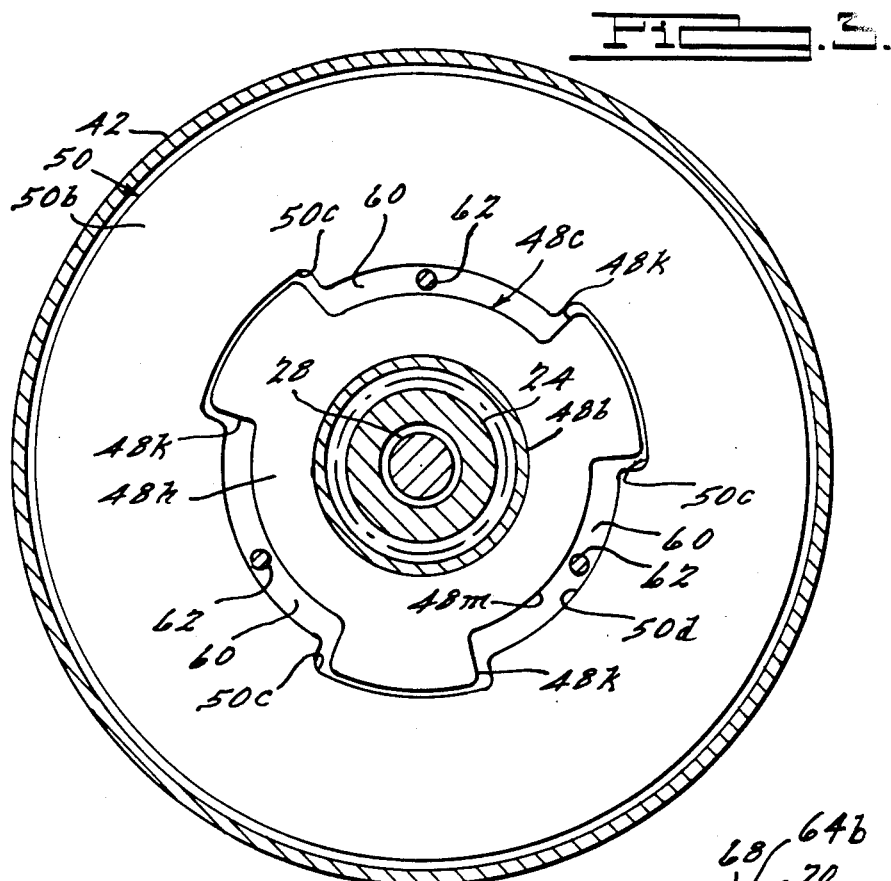
FIG. 3.
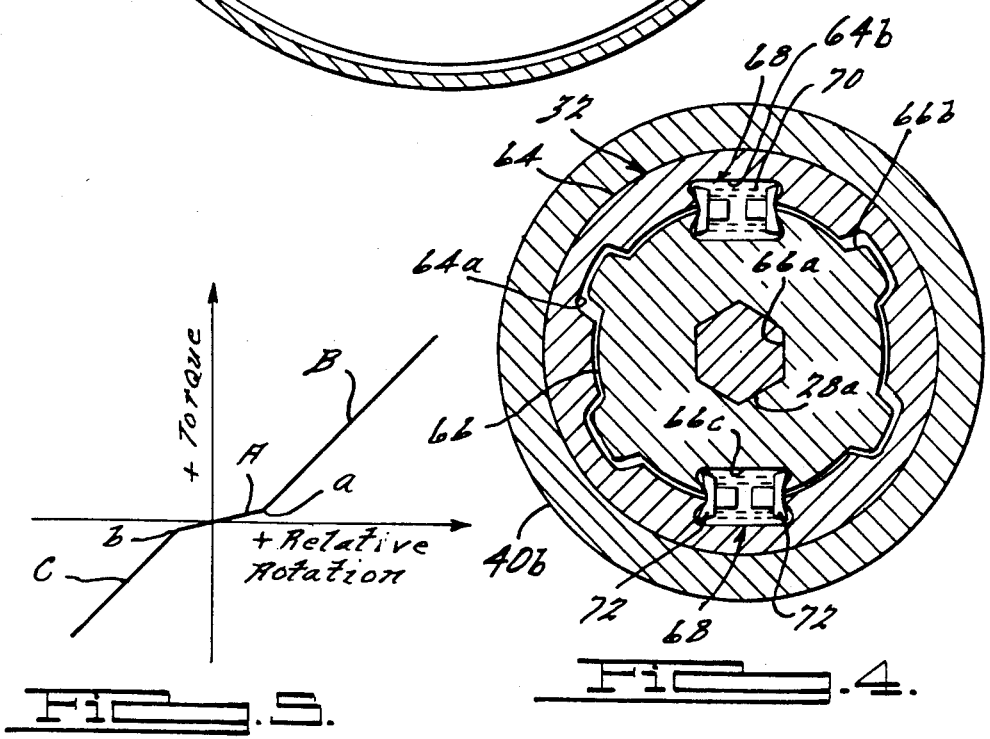
FIG. 5.
FIG. 4.

TORSION DAMPING MECHANISM

CROSS-REFERENCE TO RELATED APPLICATIONS

This application is related to U.S. patent application Ser. No. 564,537, filed Dec. 22, 1983, Ser. No. 615,017, filed May 29, 1984 and now U.S. Pat. No. 4,576,259, and Ser. No. 631,363, filed July 16, 1984 and now U.S. Pat. No. 4,608,883. These applications are assigned to the assignee of this application.

FIELD OF THE INVENTION

This disclosure relates to driveline torsion damping mechanisms operable over the entire operational range of a driveline. More specifically, the invention relates to such a mechanism for vehicle drivelines.

BACKGROUND OF THE INVENTION

It is well-known that the speed of an Otto or Diesel cycle engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to as torsionals, are transmitted through vehicle drivelines and to passengers in vehicles. The torsionals, which are often referred to as vibrations, are detrimental to driveline components and derogate passenger-ride quality. Further, the torsionals often cause driveline and vehicle body components to vibrate and produce annoying noises. An example of driveline vibration noise, known as idle rattle, occurs when a manual transmission is in neutral with its input shaft clutched to an engine running at or near idle speed; under such a condition low amplitude engine torsionals accelerate/decelerate (rattle) driven gears not under load. An example of body noise, known as body boom, occurs when an engine is lugged; under such a condition engine torsionals cause body components, such as sheet metal panels, to resonate. Still further, tip-in/tip-out torque pulses, produced by abrupt engine acceleration and/or deceleration, jerk the driveline and vehicle. Such torque pulses are also detrimental to the driveline and derogate passenger-ride quality. Herein, such torque pulses are generally referred to as torsionals. In view of the foregoing, vehicle torsional damping mechanisms, ideally, isolate and dampen torsionals which are detrimental to driveline components, which derogate passenger-ride quality, and which cause annoying driveline and vehicle body noises.

Since the inception of the automobile, many torsional damping mechanisms have been proposed and used to attenuate and dampen driveline torque changes and torsionals. For example, master clutches used in combination with manual shift mechanical transmissions have long employed torsional damping mechanisms having spring isolators and mechanical friction damper devices disposed in parallel with each other and respectively operative to attenuate and dampen driveline torque changes and torsionals when the amplitude of changing torque and torsionals exceeds the slip or breakaway torque of mechanical friction damper devices. With such damping devices, portions of amplitude changes less than the slip or breakaway torque are transmitted directly through the clutch without attenuation, i.e., flexing of the spring isolators. Accordingly, such torsional damping mechanisms fail to provide attenuation and dampening of low amplitude torque changes and torsionals. Stated in somewhat different terms, such prior art torsional dampening mechanisms function as rigid links in drivelines when the amplitudes of torque changes and torsionals are less than the slip or breakaway torque of the mechanical friction damping devices.

The torsional damping devise disclosed herein is closely related to the torsional damping mechanism disclosed in copending U.S. application Ser. No. 631,363. The mechanism therein employs a pair of long travel torsion isolating springs which improve attenuation and a viscous damper which allows attenuation of torque changes and torsionals independent of their amplitude. The viscous damper therein provides an infinite range of damping levels since the viscous clutching surfaces therein are responsive to velocity rather than the amplitude of torque changes and torsionals. Further, a lost motion is provided to one of the viscous clutching surfaces for preventing damping of relatively low amplitude torque changes an torsionals. The torsional damping mechanism disclosed herein simplifies, improves, and reduces the inertia of the damper in copending application Ser. No. 631,363. Further, the damper herein is disposed in a master clutch plate assembly adapted to drivingly interconnect driving and driver members of a driveline.

SUMMARY OF THE INVENTION

An object of the present invention is to provide an improved torsion damping device for use in combination with a master clutch plate assembly selectively connectable between an engine and a transmission.

Another object of the present invention is to provide such a device which allows attenuation of virtually all torque changes and torsionals in driveline.

Another object of the present invention is to provide such a device which allows attenuation and dampening of high amplitude torque changes and torsionals, and which allows attenuation of low amplitude torque changes and torsionals without dampening.

According to a feature of the invention, a clutch plate apparatus is adapted to drivingly interconnect driving and driven members of a driveline. The apparatus includes an annular housing assembly, an annular clutch assembly, dynamic seal means, lost motion means, and a friction assembly. The housing assembly is adapted for rotation about the axis of the driven member and includes first and second radially extending sidewall members having mutually facing surfaces defining a radially extending chamber closed at its radially outer extent and open at its radially inner extent with a radially inner portion of the first sidewall member defining an axially extending hub portion. The clutch assembly includes an annular radially extending clutching member driven by a clutch hub member adapted to be connected to the driven member with the clutching member disposed in the chamber for clutching coaction with the sidewall members via a viscous liquid and with the clutch hub member having an axially extending hub portion for journaling the hub portion of the first sidewall member thereon. The seal means is interposed between the housing and clutch assemblies for sealing the radially inner extent of the chamber. The lost motion means is adapted to be interposed between the driven member and the clutching member for allowing minor to-and-fro relative rotation between the housing assembly and the driver member without corresponding to-and-fro relative rotation between the housing assembly and clutching member. The friction assembly includes first and second axially facing friction surfaces respectively defined on opposite sides of an annular flange disposed radially outward of the housing assembly, drivingly connected to the housing assembly, and adapted to be frictionally clamped between pressure plates of an engagement mechanism defining the driving member.

According to another feature of the invention, the clutch plate apparatus of the above feature includes stop means for limiting relative rotation between the housing assembly and the driver member.

According to another feature of the invention, the clutch plate apparatus of the above two features includes resilient means having an input end and an output end respectively adapted to driving connect the friction assembly with the driver member for transmitting driveline torque therebetween in parallel with the housing assembly and clutch assembly with the resilient means being operative to flex to-and-fro in response to driveline torsionals for effecting to-and-fro relative rotation between the housing assembly and clutch member when the magnitude of the to-and-fro flexing exceeds the travel of the lost motion means.

BRIEF DESCRIPTION OF THE DRAWINGS

The torsional damping mechanism of the present invention is shown in the accompanying drawings in which:

FIG 1 is a schematic view of a motor vehicle driveline;

FIG. 2 is a sectional view of the torsional damping mechanism;

FIG. 3 is an enlarged sectional view of the torsional damping mechanism looking along line 3—3 of FIG. 2;

FIG. 4 is an enlarged sectional view of the torsional damping mechanism looking along line 4—4 of FIG. 2;

FIG. 5 is a graph schematically illustrating driveline torque as a function of relative angular rotation of portions of the torsional damping mechanism; and FIG. 6 is a graph schematically illustrating a band of low amplitude torsionals not dampened by a damping device in the torsional damping mechanism.

DETAILED DESCRIPTION OF THE DRAWINGS

The motor vehicle driveline seen schematically in FIG. 1 includes an internal combustion engine 10 and a transmission 12 having an output shaft 14 drivingly connected to a load such as a ground engaging wheel 16 via a differential gear assembly 18 for a rear and/or front axle of a vehicle. Transmission 12 includes a housing 20 containing a torsional damping mechanism 22 illustrated in FIGS. 2-4 and a plurality of unshown constant mesh ratio gears driven by a cluster gear shaft 24 partially shown in FIG. 2. Well-known ratio change clutches within the transmission are employed to selectively connect the engine with load driving shaft 14. Cluster gear shaft 24 functions as the transmission input shaft and as the torsional damping mechanism output.

Looking now specifically at the torsional damping mechanism 22 in FIGS. 2-4, the mechanism includes a clutch plate apparatus 26 and a torsion spring bar 28 disposed within a bore 24a in cluster gear shaft 24. Clutch plate apparatus 26 includes a viscous damper device 30, an idle rattle assembly 32, and a friction assembly 34. Damper device 30 includes an annular housing assembly 36 and an annular clutch assembly 38 disposed for rotation about a common axis defined by the rotational axis of shaft 24.

Housing assembly 36 includes first and second radially extending sidewall members 40, 42 having mutually facing surfaces 40a, 42a disposed normal to the axis of cluster gear shaft 24 and defining a radially extending chamber 44 closed at its radially outer extent by mating portions of the sidewalls which are sealingly secured together by a plurality of fasteners 46. Chamber 44 is preferably filled with a silicone oil, for example, diamethyl polysiloxane. The radially inner extent of sidewalls 40, 42 respectively include hub portions 40b, 42b extending axially in opposite directions. Hub portion 40b includes a blind, stepped bore 40c and hub portion 42b includes stepped bore 42c having an annular shoulder 42d defining an opening for passage of shaft 24.

Clutch assembly 38 includes a hub member 48 and a clutching member 50. Hub member 48 includes annular hub portions 48a, 48b extending axially in opposite directions and a flange or disk portion 48c extending radially outward into chamber 44 from hub portions 48a, 48b. Hub portions 48a, 48b include a plurality of internal spline teeth 48d mating with external spline teeth at end 24c of shaft 24 and outer circumferential surfaces 48e, 48f for journaling sidewall hub portions 40e, 40b thereon via schematically illustrated bearings 52, 54. Bearings 52, 54 may be of the antifriction bearing type but are preferably of the plain bearing type. Fluid leakage into and out of chamber 44 at its radially inner extent is prevented by dynamic seals 56, 58, which may be of the double lip elastomeric-type, pressed at their outer peripheries into stepped bores 40c, 42c and running respectively at their inner peripheries against surfaces 48e, 48f or against bearings 52, 54. Radially extending flange portion 48c includes oppositely facing surfaces 48g, 48h and three circumferentially spaced projections or teeth 48k formed on its circumferentially or radially outer surface portion 48m. Clutching member 50 includes oppositely facing surfaces 50a, 50b and three circumferentially spaced recesses 50c in its radially inner circumferential surface 50d. Recesses 50c loosely receive projections 48k and form therewith a lost motion means allowing minor to-and-fro relative angular rotation between hub member 48 and housing assembly 36 without corresponding to-and-fro relative angular rotation between the housing assembly and clutching member 50. The amount of lost motion may vary from driveline to driveline. For many applications, lost motions of 5 to 8 degrees seem to be acceptable. The precise amount of lost motion depends, for the most part, on driveline application, the amount of free play in the antirattle assembly 32 to be described hereinafter, etc. Alternatively, the lost motion means may be external of chamber 44; e.g. it may be disposed between shaft 24 and hub member 48.

As may be seen, clutching member 50 is free to move axially within chamber 44 and of course is free to move angularly in the chamber relative to hub member 48. Abrasion between surfaces 40a, 50a and 42b, 50b may be prevented by coating the surfaces with antiabrasion or antifriction material. The distance between surfaces 40a, 50a and 42b, 50b of course depends on the area of the surfaces, viscosity of the viscous liquid in chamber 44, and, the amount of damping desired. The surfaces 40a, 50a and 42b, 50b may be provided with dished or recessed portions to vary damping or viscous clutching coaction as taught in copending U.S. application Ser. No. 631,363, which application is incorporated herein by reference. Further, surfaces 48g, 48h of hub flange 48c may be closely spaced from surfaces 40a, 42a of housing sidewall members 40, 42 to provide viscous clutching coaction therebetween; herein such viscous clutching coaction is preferably minimized.

The outer and inner circumferential surface 48m and 50d of hub flange portion 48c and clutching member 50 are radially spaced apart to define accurate recesses 60 between projections 48k. The maximum relative angular rotation between hub member 48 and housing assembly 36 is limited by stop means defined by the radial sides of projections 48k and stop pins 62 extending through each of the accurate recesses 60. The stop arrangement herein limits the relative angular rotation to about 70 degrees. Pins 62 are anchored at their ends 62a, 62b in axially aligned blind bores in sidewall members 40, 42. Alternatively, the stop means may be external of chamber 44 and may react between one of the hub portions 48a, 48b and the housing assembly or between shaft 24 and the housing assembly. As is well known, the relative rotation between the closely spaced surfaces 40a, 50a and 42a, 50b of housing assembly 36 and clutching member 50 causes shear of the viscous liquid therebetween. The viscous clutching coaction or shear increases with increasing velocity of the relative rotation. Accordingly, torsional energy damping increases with increasing shear.

Idle rattle means 32 provides resilient angular free play or lost motion between housing assembly 36 and torsion bar 28. The idle rattle means includes a ring gear member 64 pressed or otherwise securely fixed in blind bore 40c, a hub member 66 having a central hexigonal opening 66a receiving a mating hexigonal end 28a of torsion spring bar 28, and two diametrically opposed spring assemblies 68. A hexigonal end 28b at other end of bar 28 is received in a mating hexigonal opening 24b in shaft 24. Member 64 includes four internal spline recesses 64a and two diametrically opposed spring assembly recesses 64b. Member 66 includes four external spline teeth 66b loosely received in internal spline recesses 64a and two diametrically opposed spring assembly recesses 66c which register with spring assembly recesses 64b. Spring assemblies 68 each include a helical coil spring 70 and two end members 72 which react between springs 70 and the radial sides of the spring assembly recesses to resiliently position spline teeth 66b within spline recesses 64a for resilient angular free play in both directions when torque is not being transmitted. Preferably, more angular free play is provided in the forward or positive torque directions, i.e., when torque is from housing assembly 36 to torsion bar 28. Internal spline recesses 64a and external spline teeth 66b provide first and second positive drive means allowing a predetermined relative rotation between the housing assembly 30 and the resilient torsion bar 28. Alternatively, idle rattle means 32 may be positioned between friction assembly 34 and the housing assembly or between spring bar end 28b and shaft 24.

Idle rattle springs 70 are disposed in parallel with each other and are in turn in series with torsion spring bar 28 shaft. Deflection of springs 70 is limited by the amount of angular free play between spline recesses 64a and spline teeth 66b. The maximum combined deflection of this series-parallel spring arrangement, in terms of relative angular rotation between housing assembly 36 and cluster gear shaft 24, in limited by stop pins 62 of the stop means. Springs 70 are designed to provide a force sufficient to resiliently drive shaft 24 when the transmission is in neutral, i.e., when shaft 24 is not connected to a load. Hence, springs 70 are of a relatively low rate or stiffness compared to torsion spring bar 28 which is designed to transmit maximum driveline torque.

Friction clutch assembly 34 includes first and second axially facing friction surfaces 74a, 76a defined by friction material members 74, 76 secured on opposite sides of an annular radially extending flange or spider 78 disposed radially outward of or circumscribing the out circumferential extent of housing assembly 36. Herein, flange 78 is integrally formed with sidewall member 42, is flat and has friction members 74, 76 adhesively bonded thereto, and includes a plurality of circumferentially spaced lightening openings 80 which also provide flexibility. Alternatively, flange 78 may be formed separately and be axially resilient. For example, flange 78 may have a segmented wave washer shape to provide resiliency which is believed to lessen engagement shocks when friction surfaces 74a, 76a are clamped between partially shown pressure plates 82, 84 illustrated in phantom lines. The pressure plates are driven by the engine and are selectively actuated by an unshown engagement mechanism to effect a driving connection to cluster gear shaft 24 and to the load when the transmission is not in neutral.

Operation of the structure of torsional damping mechanism 22 may be more readily understood in view of graphs 5 and 6 in combination with the foregoing description. Graph 5 schematically illustrates the so called steady-state driveline torque as a function of relative angular rotation between housing assembly 36 and cluster gear shaft 24 in response to deflection of idle rattle springs 70 and torsion spring bar 28. Curve A between points a and b represents positive and negative torque and rotation within the limits allowed by the free play in idle rattle assembly 32. Curves B and C respectively represent positive (forward) torque and negative (coast) torque when shaft 24 is under load.

Graph 6 schematically illustrates two driveline positive torque levels with the so called steady-state torques being represented by straight curves D and E and having sinusoidal curves F, G and H, I respectively superimposed thereon to represent torsionals of the different amplitudes. The lower amplitude torsionals, F and H, correspond to torque changes having a peak-to-peak torque change J which flexes torsion spring bar an amount less than or equal to the lost motion between projections 48k and recesses 50c and in damper device 30. Accordingly, torsionals having amplitude less than or equal to torque change J effect relative rotation between housing assembly 36 and cluster gear shaft 24 without corresponding relative rotation between the housing assembly and clutching member 50 and without viscous clutching coaction between housing surfaces 40a, 42a and clutching member surfaces 50a, 50b. Hence, torsionals having an amplitude less than or equal to the torque change J are attenuated by torsion spring bar 28 without damping. The higher amplitude torsionals, such as torsionals G and I, are attenuated without damping for portions of their torque change which is less than torque change J, and are attenuated and dampened for the portions of their torque change which is greater than torque change J.

Functional advantages and features provided by torsional damping mechanism include resiliently driving cluster gear shaft with springs of low rate or low stiffness to prevent or reduce idle rattle, attenuation of all driveline torque changes and torsionals independent of the amplitude, dampening portions of torque changes and torsionals exceeding a predetermined amount, and attenuation of portions of torque changes and torsionals less than the predetermined amount without dampening. Further, mechanism 22 is configured to provide the above advantages and features with a structure of low inertia. For example, viscous damper devise 30 is concentrated about its rotational axis with the mass of sidewalls 40, 42 and clutching member 50 being minimized at their positions radially beyond the hub portions of the sidewalls. Further, inertia and the axial dimensions of devise 30 are minimized by use of a torsion spring bar 28; by minimizing the thickness of hub flange 48c and clutching member 50; and by maintaining hub flange 48c, clutching member 50, and the lost motion means therebetween within the axially spaced surfaces defined by housing member surfaces 40a, 42a which are normal to the axis of rotation.

While a preferred embodiment of the present invention has been illustrated and described in detail, it will be apparent that various changes and modifications may be made in the disclosed embodiment without departing from the scope and spirit of the invention. A few of such changes and modifications have been mentioned herein. The appended claims are intended to cover the disclosed embodiment and all changes and modifications believed to be within the spirit of the invention.

What is claimed is:

1. A clutch plate apparatus adapted to drivingly interconnect driving and driven members of a driveline; said apparatus comprising:
    an annular housing assembly adapted for rotation about an axis of the driven member, said housing assembly including first and second radially extending sidewall members having mutually facing surfaces defining a radially extending chamber closed at its radially outer extent and open at its radially inner extent, and a radially inner portion of the first side wall member defining an axially extending hub portion;
    an annular clutch assembly including an annular radially extending clutching member driven by a clutch hub member adapted to be connected to the driven member, said clutching member disposed in said chamber for viscous clutching coaction with said sidewall members via a viscous liquid, and said clutch hub member having an axially extending hub portion for journaling the hub portion of said first sidewall member thereon;
    dynamic seal means interposed between said housing and clutch assemblies for sealing the radially inner extent of said chamber;
    lost motion means adapted to be interposed between said driven member and said clutching member for allowing minor to-and-fro relative rotation between said housing assembly and said driven member without corresponding to-and-fro relative rotation between said housing assembly and clutching member; and
    a friction assembly including first and second axially facing friction surfaces respectively defined on opposite sides of an annular flange disposed radially outward of said housing assembly, drivingly connected to said housing assembly, and adapted to be frictionally clamped between pressure plates of an engagement mechanism defining said driving member.

2. The clutch plate apparatus of claim 1, wherein said lost motion means is disposed between said clutching and hub members of the clutch assembly.

3. The clutch plate apparatus of claim 1, further including;
    stop means for limiting relative rotation between said housing assembly and the driven member.

4. The clutch plate apparatus of claim 3, wherein said stop means includes;
    a stop member fixed to at least one of said sidewall members and said clutch hub member and operative to engage said stop member in response to said relative rotation exceeding a predetermined amount.

5. The clutch plate apparatus of claim 1, wherein said lost motion means comprises:
    a radially outer portion of said clutch hub member including a plurality of circumferentially spaced projections; and
    a radially inner portion of said clutching member including a plurality of circumferentially spaced recesses loosely receiving said projections for allowing limited relative rotation therebetween.

6. The clutch plate apparatus of claim 5, further including stop means comprising:
    radially outer and inner portions of said clutch hub member and said clutching member respectively being radially spaced apart between at least two of said circumferentially spaced projections; and
    a stop member fixed to at least one of said sidewall members, projecting into the space between said two radially spaced projections, and operative to contact either one of the two projections when said relative rotation exceeds a predetermined amount.

7. The clutch plate apparatus of claim 1, further including;
    resilient means having an input end and an output end respectively adapted to drivingly connect said friction assembly with said driven member for transmitting driveline torque therebetween in parallel with the viscous clutching coaction between said housing assembly and clutch assembly, said resilient means operative to flex to-and-fro in response to driveline torsionals for effecting to-and-fro relative rotation between said housing assembly and clutching member when the magnitude of to-and-fro flexing exceeds the travel of said lost motion means; and
    stop means for limiting flexing of said resilient means.

8. The clutch plate apparatus of claim 7, wherein said driven member defines a transmission input shaft selectively connectable to a load driven by the transmission and further including;
    idle rattle means disposed between said friction assembly and said resilient means, said idle rattle means including first and second positive drive means allowing a predetermined relative rotation therebetween and second resilient means biasing said positive drives apart with a force insufficient to maintain said positive drives apart when said input shaft is connected to the load and said friction surfaces are clamped between said pressure plates.

9. The clutch plate apparatus of claim 8, wherein said idle rattle means is disposed between the hub portion of said first sidewall member and the input end of said resilient means transmitting driveline torque.

10. The clutch plate apparatus of 7, wherein;
a radially inner portion of said second sidewall member includes a hub portion extending axially in a direction opposite the hub portion of said first sidewall member, said clutch hub member including a second hub portion extending axially in a direction opposite the first mentioned hub portion of said clutch hub member for journaling the hub portion of the second sidewall member thereon, and said clutch hub member including a radially extending flange portion extending radially outward into said chamber from said clutch hub member and being connected to said clutching member by said lost motion means.

11. The clutch plate apparatus of claim 10, wherein said mutually facing surfaces of said sidewall members defining said chamber being substantially uniformly spaced a predetermined axial distance apart along their radial extent, and said clutch member being of a thickness less than said predetermined distance and being disposed to float axially between said surfaces.

12. The clutch plate apparatus of claim 11, wherein the flange portion of said clutch hub member is of a thickness less than the thickness of said clutching member.

13. A low inertia, viscous damped mechanism adapted to drivingly interconnect driving and driven members of a driveline; said mechanism comprising:
an annular housing assembly adapted for rotation about an axis of the driven member, said housing assembly including first and second radially extending sidewall members having mutually facing axially spaced apart surfaces disposed in planes normal to said axis and defining a radially extending chamber closed at its radially outer extent, said chamber being open at its radially inner extent and containing a viscous liquid, and a radially inward portion of said first and second sidewalls respectively defining first and second hub portions extending axially in opposite directions;
an annular clutch assembly including an annular radially extending clutching member and a hub member disposed for rotation about said axis and adapted to be connected to said driven member, said clutching member disposed in said chamber for viscous clutching coaction with said sidewall members within said axially spaced apart surfaces of said sidewall members, and said hub member having first and second hub portions extending axially in opposite directions and respectively providing annular surfaces for journaly said first and second hub portions of said side walls thereon;
lost motion means interposed between said clutching member and said hub member for allowing minor to-and-fro relative angular rotation between said housing assembly and said driven member without corresponding to-and-fro relative angular rotation between said housing assembly and clutching member, said lost motion means being disposed within said radial planes defined by said axially spaced apart surfaces of said sidewall members; and a friction assembly including first and second axially facing friction surfaces respectively defined on opposite sides of an annular flange portion disposed radially outward of said housing assembly and adapted to be frictionally clamped between pressure plates of an engagement mechanism defining said driving member;

14. The viscous damped mechanism of claim 13 further including:
resilient means connected at its input end to said housing assembly and at its output end to said hub member.

15. The viscous damped mechanism of claim 13, further including:
a transmission input shaft defining the driven member, said shaft connected at one end to said hub member and having a bore extending axially therethrough; and
a torsion spring bar connected at its input end to a hub portion of one of side sidewall members and at its output end to the other end of said shaft.

16. The viscous coupling of claim 13, further including:
an idle rattle assembly serially interposed with said torsion spring bar.

17. The viscous coupling of claim 16, wherein said idle rattle assembly is interposed between side one hub portion of one of said sidewall members and said input end of said torsion spring bar.

18. A clutch plate assembly including inner and outer assemblies disposed for relative rotation about an axis and defining a viscous shear damper; the inner assembly including clutching means disposed radially outward of and drivingly connected to a hub splined to and supported by a driven member of a driveline; the outer assembly being a housing including first and second radially extending sidewalls defining a sealed chamber receiving the clutching means for viscous shear clutching coaction via a viscous fluid in the chamber, at least one of the sidewalls having a central opening rotatably supported on the hub; a friction assembly disposed radially outward of and fixed to the housing for clutching to a driving member of the driveline; resilient means drivingly interposed between the housing and driven member for transmitting driveline torque between driving and driven members and for allowing relative rotation between the clutching means and housing; the improvement comprising:
means for minimizing axial thickness and inertia of the clutch plate assembly, said means comprising said clutching means being a relatively thin member having flat axially facing oppositely facing clutching surfaces, and at least the radially outer portion of the sidewalls being relatively thin members having flat axially mutually facing surfaces having a minimum axial spacing therebetween for minimizing the volume of the chamber.

19. The clutch plate of claim 18, wherein said resilient means is drivingly interposed between said housing and driven member independent of said hub.

20. The clutch plate of claim 19, further including lost motion means disposed between said clutching means and driver member for allowing relative rotation between said housing and driver member without corresponding relative rotation between the clutching surface of the housing and clutching means over the full torque transmitting range of the resilient means.

21. The clutch plate of claim 20, further including:

idle rattle means in series within said resilient means and interposed between said housing and driven member, said idle rattle means including second resilient means having a spring rate less than the spring rate of first mentioned resilient means.

22. The clutch plate of claim 18, wherein said inertia is further minimized by said resilient means being a torsion spring shaft positioned along said axis within a bore in said driven member and drivingly interposed between said housing and driven member independent of said hub.

23. The clutch plate of claim 22, further including lost motion means disposed between said clutch means and driven member for allowing relative rotation between said housing and driven member without corresponding relative rotation between the clutching surfaces of the housing and clutching means over the full torque transmitting range of the torsion spring shaft.

24. The clutch plate of claim 22, further including stop means for limiting angular flexing of the torsion spring shaft.

25. A low inertia, viscous damped mechanism adapted to drivingly interconnect driving and driven members of a driveline; said mechanism comprising:
an annular housing assembly adapted for rotation about an axis of the driven member, said housing assembly including first and second radially extending sidewall members having mutually facing axially spaced apart flat surfaces disposed in planes normal to said axis and defining a radially extending chamber closed at its radially outer extent, said chamber being open at its radially inner extent and containing a viscous liquid, and a radially inward portion of said first and second sidewalls respectively defining first and second hub portions extending axially in opposite directions;
an annular clutch assembly including an annular radially extending clutching member and a hub member disposed for rotation about said axis and adapted to be connected to said driven member, said clutching member disposed in said chamber and having oppositely facing flat surfaces for viscous clutching coaction with said sidewall members within said axially spaced apart surfaces of said sidewall members, and said hub member having first and second hub portions extending axially in opposite directions and respectively providing annular surfaces for journaling said first and second hub portions of said sidewalls thereon;
lost motion means interposed between said clutching member and said hub member for allowing minor to-and-fro relative angular rotation between said housing assembly and said driven member without corresponding to-and-fro relative angular rotation between said housing assembly and clutching member, said lost motion means being disposed within said radial planes defined by said axially spaced apart flat surfaces of said sidewall members;
a friction assembly including first and second axially facing friction surfaces respectively defined on opposite sides of an annular flange portion disposed radially outward of said housing assembly and adapted to be frictionally clamped between pressure plates of an engagement mechanism defining said driving member; and
a torsion spring shaft connected at its input end to one of said sidewall hub portion and at its output end to said driven member.

* * * * *